United States Patent
Tadepalli et al.

(10) Patent No.: US 6,751,049 B2
(45) Date of Patent: Jun. 15, 2004

(54) DOWNSTREAM FINNED SHROUD AIRSTREAM CONDITIONING APPARATUS FOR A DATA STORAGE DEVICE

(75) Inventors: Srinivas Tadepalli, Eden Prairie, MN (US); David Allsup, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 139 days.

(21) Appl. No.: 09/895,984

(22) Filed: Jun. 29, 2001

(65) Prior Publication Data

US 2002/0008934 A1 Jan. 24, 2002

Related U.S. Application Data

(60) Provisional application No. 60/217,042, filed on Jul. 10, 2000.

(51) Int. Cl.[7] ............................................. G11B 33/14
(52) U.S. Cl. ................................................... 360/97.02
(58) Field of Search ...................... 360/97.02, 97.03, 360/97.04, 97.01; 369/258, 263, 176

(56) References Cited

U.S. PATENT DOCUMENTS

| | | | | |
|---|---|---|---|---|
| 3,720,931 A | | 3/1973 | Andersen ................. 360/97.03 |
| 4,008,492 A | * | 2/1977 | Elsing ..................... 360/97.03 |
| 4,412,261 A | * | 10/1983 | Tateyama et al. ........ 360/97.03 |
| 4,821,130 A | * | 4/1989 | Bernett et al. ........... 360/78.04 |
| 5,134,530 A | | 7/1992 | Hall ........................ 360/97.03 |
| 5,140,578 A | | 8/1992 | Tohkairin ................. 369/75.2 |
| 5,212,679 A | | 5/1993 | Tohkairin ................. 369/75.2 |
| 5,631,787 A | * | 5/1997 | Huang et al. ............ 360/97.03 |
| 5,636,082 A | | 6/1997 | Shibuya et al. .......... 360/97.02 |
| 5,696,649 A | | 12/1997 | Boutaghou ............... 360/97.03 |
| 5,898,545 A | * | 4/1999 | Schirle .................... 360/254.7 |
| 6,462,901 B1 | * | 10/2002 | Tadepalli ................. 360/97.03 |
| 6,487,038 B1 | * | 11/2002 | Izumi et al. ............. 360/97.02 |

* cited by examiner

Primary Examiner—A. J. Heinz
Assistant Examiner—Angel Castro
(74) Attorney, Agent, or Firm—Jennifer M. Buenzow

(57) ABSTRACT

An airstream conditioning apparatus for a data storage device. The data storage device has an enclosure supporting a spinning data disc and an actuator operably interfacing with the data disc in a data transfer relationship. The apparatus comprises a shroud supportable in the enclosure only downstream of the actuator with respect to air currents generated by the spinning disc. The shroud furthermore comprises a fin extending from the shroud in planar alignment with the disc.

21 Claims, 5 Drawing Sheets

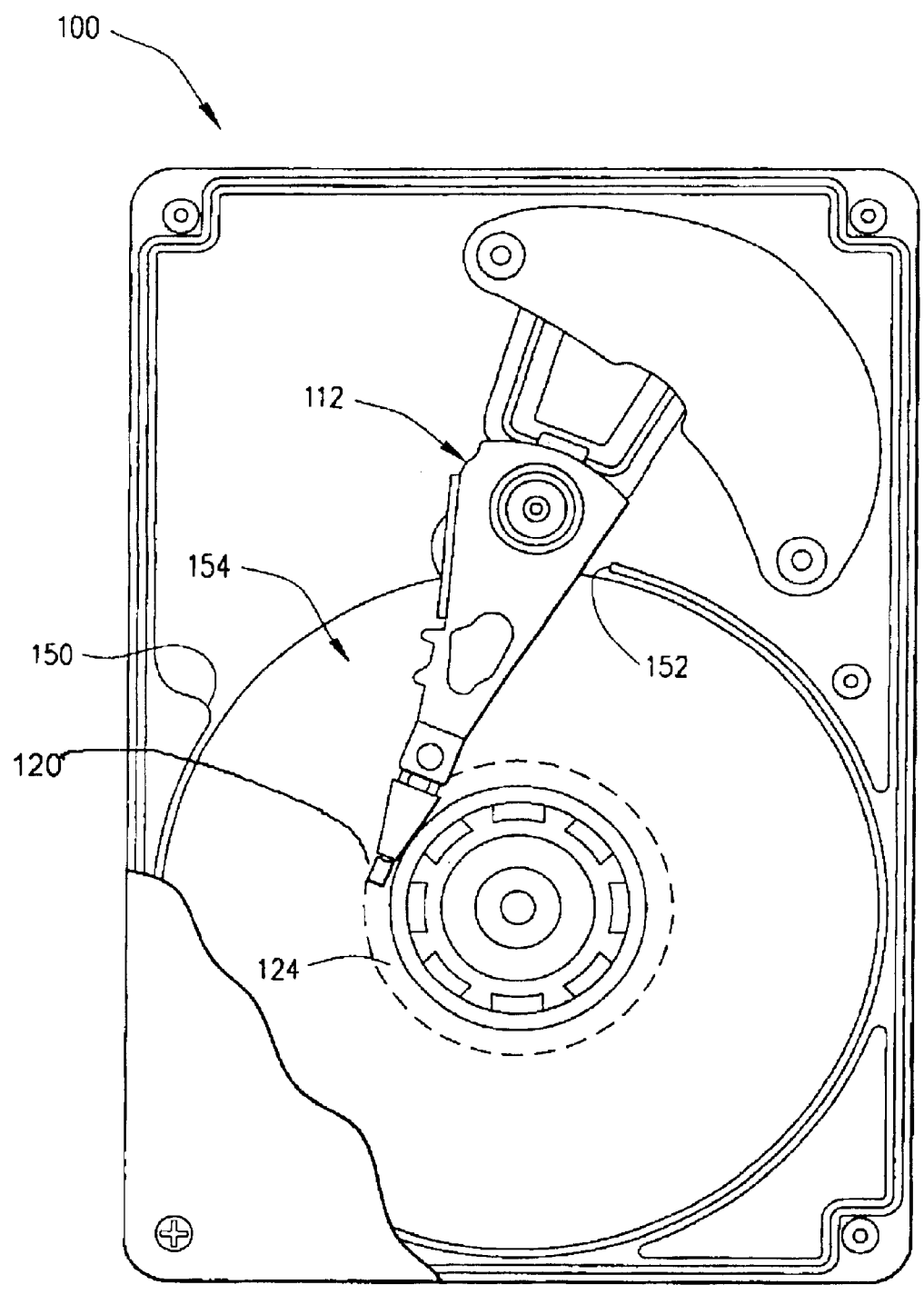
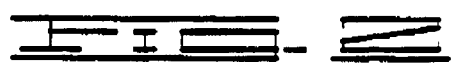

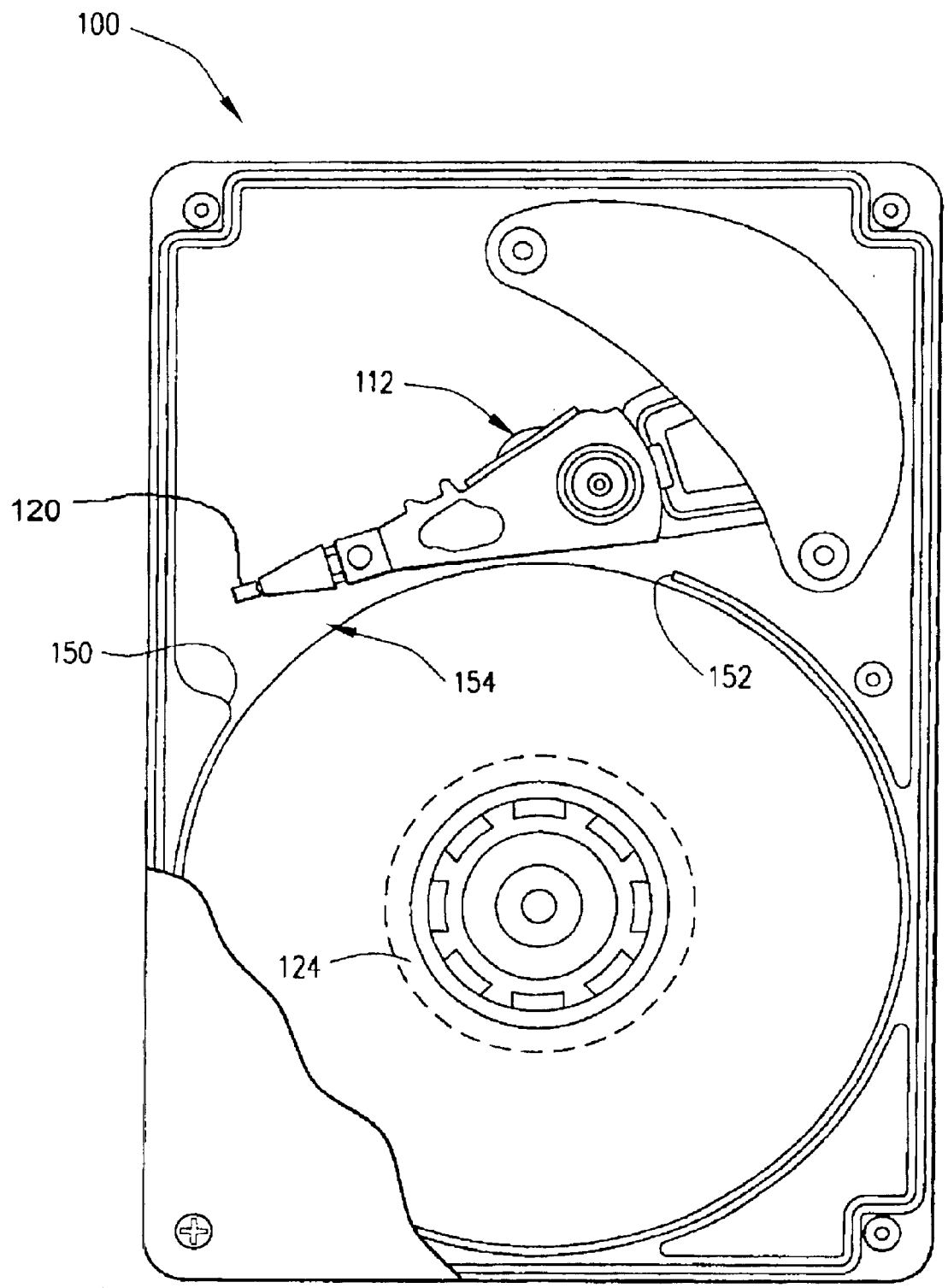
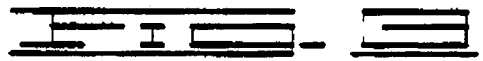

ately interfacing read/write components by air currents generated by the spinning discs in the disc drive.

DOWNSTREAM FINNED SHROUD AIRSTREAM CONDITIONING APPARATUS FOR A DATA STORAGE DEVICE

CROSS REFERENCE TO RELATED APPLICATIONS

This application claims the benefit of U.S. Provisional Application No. 60/217,042 filed Jul. 10, 2000.

FIELD OF THE INVENTION

This invention relates generally to the field of data storage devices, and more particularly but not by way of limitation to controlling the aerodynamic excitation imparted to operatively interfacing read/write components by air currents generated by the spinning discs in the disc drive.

BACKGROUND OF THE INVENTION

Modem disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member such as a magnetic transducer is moved by an actuator to operatively interfacing positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance above the data storage surface upon an air bearing generated by air currents caused by the spinning discs.

A continuing trend in the industry is toward ever-increasing data storage capacity and processing speed while maintaining or reducing the physical size of the disc drive. Consequently, the data transfer member and supporting structures are continually being miniaturized, and data storage densities are continually being increased. The result is an overall increased sensitivity to vibration, as a percentage of track width. These vibrations can have an adverse effect on the positioning control systems moving the actuator relative to the spinning discs.

One source of excitation that can no longer be disregarded comes from the air currents moving within the disc stack and impinging on disc drive components. The air current velocity, and hence the associated forces, increase in relation to the radial distance from the axis of rotation. Thus, the air currents move faster and are more likely turbulent at outer portions of the discs. Turbulence can impart adverse vibrations, or aerodynamic excitation, to the discs (flutter) and/or to the actuator, particularly to the suspension members (buffeting). Turbulence can also be created by shedding vortices formed from the actuator wake as the airstream flows past the actuator, and also acting on the disc edges as the air currents are expelled from the disc stack. Further, wake excitation from the actuator increases disc vibration.

It has been determined that airstream excitation can be reduced by an airstream conditioning apparatus comprising a finned shroud downstream of the actuator, effecting the three dimensional wake particularly in the region of the actuator and disc read/write interface. It is to this improvement that embodiments of the present invention are directed.

SUMMARY OF THE INVENTION

Embodiments of the present invention are directed to an airstream conditioning apparatus for a data storage device. The data storage device has an enclosure supporting a spinning data disc and an actuator operably interfacing with the data disc in a data transfer relationship. The apparatus comprises a shroud supportable in the enclosure downstream of the actuator with respect to air currents generated by the spinning disc, laminarizing the flow and reducing three dimensional effects of the wake in the enclosure at the disc and actuator interface. The shroud furthermore comprises a fin extending from the shroud and terminating in a closely fitting relationship with the disc edge preventing coupling of air currents in spaces between adjacent discs.

These and various other features as well as advantages which characterize the present invention will be apparent upon reading of the following detailed description and review of the associated drawings.

BRIEF DESCRIPTION OF THE DRAWINGS

FIGS. 2 and 3 are simplified plan views of the disc drive of FIG. 1 more particularly illustrating the shroud formed by the base deck.

DETAILED DESCRIPTION

Figure 1:
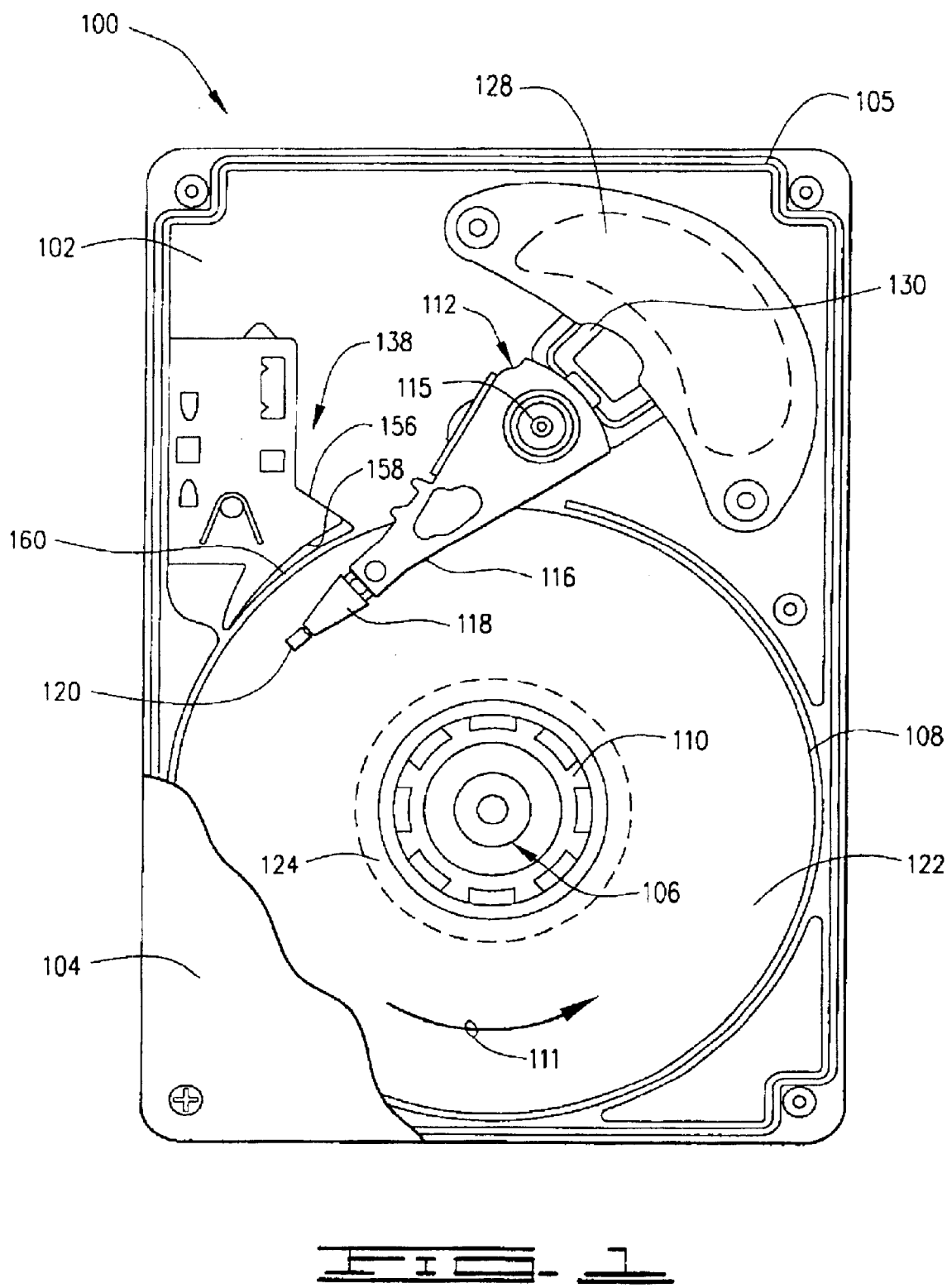
FIG. 1 is a diagrammatic plan representation of a disc drive constructed in accordance with an embodiment of the present invention, having the cover partially cut away.

Referring to the drawings in general, and more particularly to FIG. 1, shown therein is a plan representation of a disc drive 100 constructed in accordance with the present invention. The disc drive 100 includes a base 102 to which various disc drive components are mounted, and a cover 104 (partially cut-away) which together with the base deck 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base 102 is a motor 106 to which one or more discs 108 are stacked and secured by a clamp ring 110 for rotation at a high speed. Where a plurality of discs 108 are stacked to form a disc stack, adjacent discs 108 are typically separated by a disc spacer (not shown). An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 are flex members that support data transfer members, such as read/write heads 120, with each of the read/write heads 120 operatively interfacing a surface of one of the discs 108 and maintained in a data reading and writing spatial relationship by a slider (not shown) which operably supports the read/write head 120 on an air bearing sustained by air currents generated by the spinning discs 108.

Each of the discs 108 has a data storage region comprising a data recording surface 122 divided into concentric circular data tracks (not shown). Each of the read/write heads 120 operatively interfaces a respective desired data track to read data from or write data to the data track. The data recording surface 122 can be bounded inwardly by a circular landing zone 124 where the read/write heads 120 can come to rest against the respective discs 108 at times when the discs 108 are not spinning. Alternatively, the landing zone can be located elsewhere on the disc 108.

The actuator 112 is positioned by a voice coil motor (VCM) 128 comprising an electrical coil 130 and a magnetic circuit source. The magnetic circuit source conventionally comprises one or more magnets supported by magnetic poles to complete the magnetic circuit. When controlled current is passed through the actuator coil 130, an electromagnetic field is set up which interacts with the magnetic circuit causing the actuator coil 130 to move. As the actuator coil 130 moves, the actuator 112 pivots around the pivot bearing 115, causing the read/write heads 120 to travel across the discs 108.

As noted earlier, the motor 106 spins the discs 108 at a high speed as the read/write head 120 reads data from and writes data to the data storage surface 122. The kinetic energy of the spinning discs 108 transfers through the boundary layer at the disc/air interface, thereby inducing a rotational force component to the air in the disc stack. Centrifugal force imparts a radial force component on the air as well. These currents combine to produce an outwardly-spiraling airstream that is eventually expelled from the disc stack. The air currents gain velocity in moving radially outward because of the relatively faster linear speed of the disc 108 as the radial distance from the axis of rotation increases.

An airflow conditioning apparatus 138 comprises a finned shroud that is supportable downstream of the actuator 112 with respect to the direction of air currents created by the spinning discs 108. As used herein, "shroud" means a stationary peripheral upstanding surface disposed transversely to the edges of the spinning discs 108. Typically, a shroud is provided around the spinning discs 108 to laminarize the flow and reduce three dimensional effects in the enclosure. Shrouding also reduces the viscous dissipation losses, which is the energy loss associated with the expelled air accelerating air tangentially disposed to the discs 108. More particularly, the downstream shroud as embodied in FIG. 1 laminarizes the flow by attenuating the three dimensional wake effects in the enclosure at the disc and actuator interface. For purposes of this description, "disc and actuator interface" means a volume surrounding the actuator 112, more particularly the read/write head 120 and flexure member 118, at any given time when the read/write head 120 is adjacent a desired data track. That is, the disc and actuator interface defines a volume surrounding the actuator where turbulent air currents will adversely affect the nominal fly height of the read/write head 120 so as to affect the read or write signal to result in data reading/writing error or read/write head 120 positioning errors.

To minimize part count and simplify manufacturing processes, it can be advantageous to provide a shroud as a portion of the base 102. Ideally, the base 102 would have a characteristic upstanding portion or portions that entirely shroud the periphery of the spinning data discs 108. However, an opening is required in the shroud for the actuator 112. The opening is, at a minimum, wide enough to provide clearance for a medial portion of the actuator 112 in moving the read/write heads 120 within the desired limits of travel.

FIGS. 2 and 3 are simplified views of a portion of the disc drive 100 of FIG. 1, illustrating the shroud formed by the base 102 that extends circumferentially from a first end 150 to a second end 152, leaving an opening 154 through which the actuator 112 moves. In FIG. 2 the actuator 112 is pivoted to the desired inner travel limit whereat the read/write head 120 can land in the landing zone 124. In FIG. 3 the actuator 112 is pivoted to the desired outer travel limit whereat the actuator 112 and the disc stack are demerged. This permits assembly or replacement of either the actuator 112 or the disc stack while the other remains installed. This also permits the use of read/write head 120 parking devices (not shown), such as off load ramps, that support the read/write heads 120 away from the disc stack for enhanced nonoperational shock protection.

If, as in the disc drive 100 of FIG. 1, the actuator 112 operative outer travel limit is the outermost data track, that is the actuator doesn't need to travel beyond the disc edge, then the portion of the discs 108 downstream of the actuator 112 can be shrouded after the actuator 112 and disc stack are merged. Accordingly, the airstream conditioning apparatus 138 of FIG. 1 comprises an attaching frame portion 156 that supports a shroud portion defining a perimeter surface 158 disposed substantially transverse to the disc 108 outer edge. The perimeter surface 158 extends from a first end adjacent the terminal end 150 of the base 102 shroud to a second end to narrow the opening 154 (FIGS. 2 and 3) through which the actuator 112 moves, thereby preferably shrouding the discs 108 as much as possible.

Figure 4:
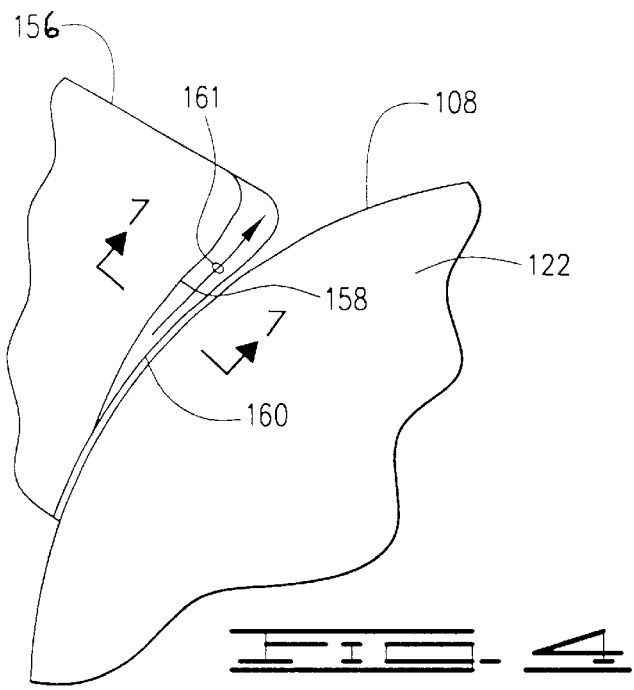
FIG. 4 is an enlarged detail representation of the finned shroud of FIG. 1.

FIG. 4 is an enlarged detail representation of a portion of the perimeter surface 158 portion of the shroud, which is disposed in a closely fitting relationship relative to the disc 108 edge. By tapering the perimeter surface 158 slightly away from the disc 108 edge in moving away from the path of the actuator 112 travel, substantially no air will be expelled from the disc stack at the interface of the actuator 112 (more particularly the read/write head 120 and/or flexure member 118) and the disc 108. That is, by tapering the perimeter surface 158 of the shroud away from the disc 108 edge, proportionately more of the air currents will be expelled from the disc stack away from the actuator 112 and disc 108 interface. Furthermore, the tapered perimeter surface 158 channels the expelled air currents in a direction denoted by arrow 161.

Figure 5:
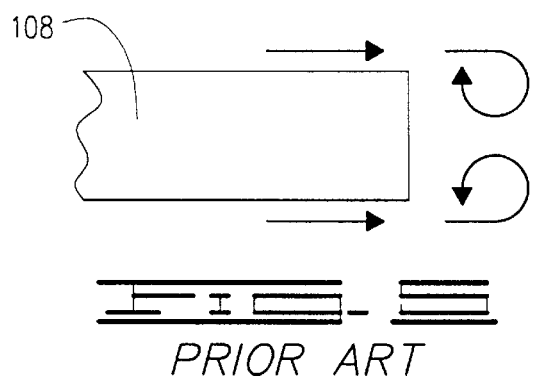
FIG. 5 is a diagrammatic elevational view of a prior art construction illustrating coupling currents from adjacent spaces creating shedding vortices acting on the disc edge.
Figure 6:
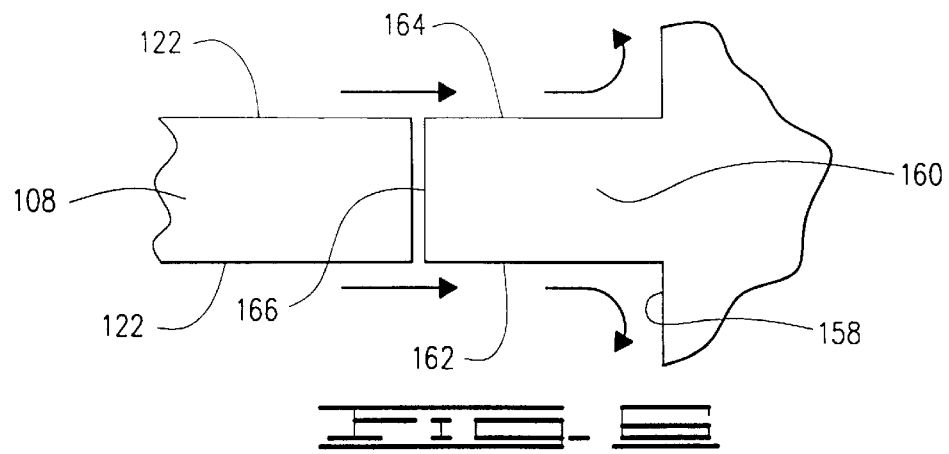
FIG. 6 is a diagrammatic elevational view of a downstream finned shroud in accordance with an embodiment of the present invention illustrating air currents being guided away from the disc edge preventing shedding vortices.
Figure 7:
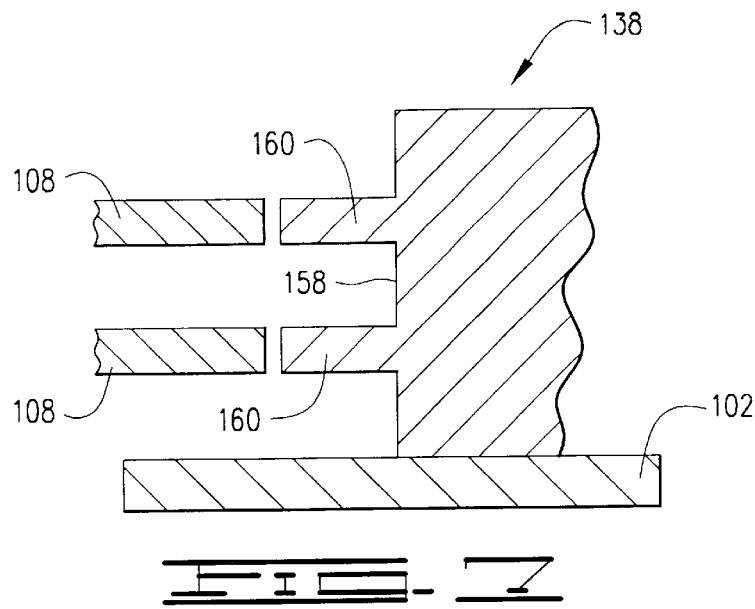
FIG. 7 is a cross-sectional view taken along the line 7—7 of FIG. 4.

But as the gap between the perimeter surface 158 and the disc 108 edge grows, resulting in relatively more of the air currents being expelled from the disc stack, the greater is the likelihood that air currents in adjacent disc spacings will couple to create turbulence at the disc 108 edge. FIG. 5 illustrates the manner in which the radially expelled air currents form circular eddies imparting axial forces creating aerodynamic excitation at the disc 108 edge. This turbulence is caused by vortices shed from the disc 108 edge. To minimize the effects of shedding vortices, the airstream conditioning apparatus 138 (FIG. 1) can comprise a fin 160, as shown in FIG. 6, comprising opposing planar surfaces 162, 164 substantially coextensively aligned with the data storage surfaces 122 of the respective disc 108. A transverse edge 166 is disposed in a substantially constant clearance from the disc 108 edge. The expelled air currents, as indicated by the reference arrows in FIG. 6, are thus diverted from the disc 108 without coupling to reduce the effects of shedding vortices. FIG. 7 is a cross sectional view taken along the line 7—7 in FIG. 4, illustrating, for example, a two-disc 108 disc stack with a corresponding two-fin downstream finned shroud.

Figure 8:
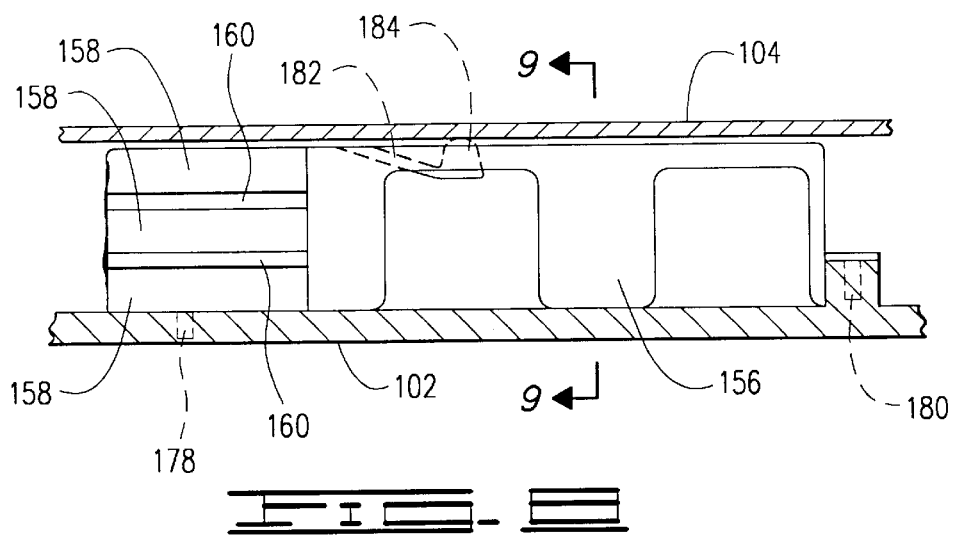
FIG. 8 is an elevational view of the frame portion of the airflow conditioning apparatus of FIG. 1.

A design-for-manufacturability feature provides for securing the attaching frame 156 portion of the airstream conditioning apparatus 138 in the enclosure without the need for separate fasteners, such as threaded fasteners. FIG. 8 illustrates a partial sectional view of the attaching frame 156 in the manner in which it can be operatively interposed between the base 102 and the cover 104. The attaching frame 156 can be provided with one or more locating tabs 178 at one end thereof, and one or more locating tabs 180 at the other end thereof, which align with corresponding apertures in the base 102 in the operative position of the attaching frame 156. A cantilevered-extending spring member 182 has an enlarged portion 184 that is pressingly engaged by the cover 104 when attached to the base deck 102. This subjects the spring member 182 to a force that is transferred to the attaching frame 156, thereby urging the attaching frame 156 against the base 102. This cooperation of the spring 182 and tabs 178, 180 provides the necessary attachment force on the attaching frame 156 without the need for separate fasteners.

Figure 9:
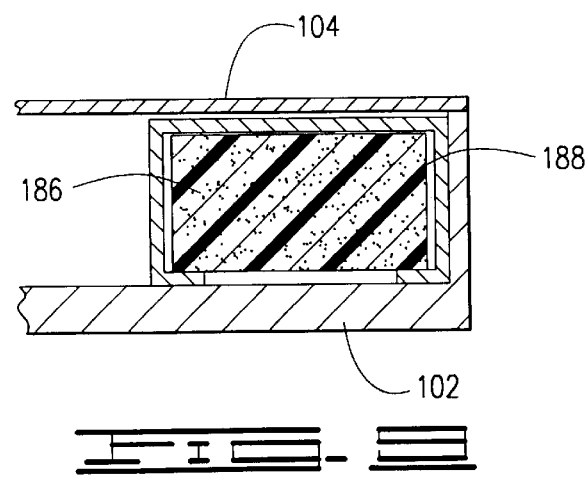
FIG. 9 is a cross sectional view taken along the section line 9—9 in FIG. 8.

FIG. 9 is a cross sectional view taken along the line 9-9 of FIG. 8, illustrating a cavity 186 formed by the attaching frame 156 that can receivingly support a filter cartridge 188.

In summary, an airstream conditioning apparatus is disclosed for a data storage system (such as 100) for attenuating the aerodynamic excitation effects of air currents generated within a data stack of data discs (such as 108) spinning under the control of a motor (such as 106). The data discs spin operatively interfacing with an actuator (such as 112) supporting a read/write assembly (such as 120) in a data reading and writing relationship.

The airstream conditioning apparatus can include a downstream finned shroud (such as 138) that laminarizes the airstream and reduces aerodynamic excitation on the discs and actuator assembly. The shroud can have a number of fins (such as 160) extending substantially coextensively to the discs and in a closely-fitting edge-to-edge relationship to guide the expelled air currents away from the disc stack without coupling of air currents from the spaces between adjacent discs.

The airstream conditioning apparatus can furthermore include a frame (such as 156) supportable by an enclosure (such as 102) of the data storage system and supporting, in turn, the finned shroud. The frame can include a bias member (such as 182) that is compressingly engageable with the enclosure providing an attachment force on the frame within the enclosure.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the airstream conditioning apparatus while maintaining substantially the same functionality without departing from the scope and spirit of the present invention. In addition, although the preferred embodiment described herein is directed to an airstream conditioning apparatus for a disc drive system, it will be appreciated by those skilled in the art that the teachings of the present invention can be applied to other systems, like testing or certification systems, servo track writers, or optical storage systems, without departing from the scope and spirit of the present invention.

What is claimed is:

1. An airstream conditioning apparatus for a data storage device, the data storage device having an enclosure supporting a spinning data disc and an actuator operably interfacing with the data disc in a data transfer relationship, the apparatus comprising a shroud supportable in the enclosure only and immediately downstream of the actuator with respect to air currents generated by the spinning disc and disposed along the data disc edge in a closely fitting relationship, wherein the shroud further comprises a perimeter surface that extends from a first end adjacent the terminal end of the shroud to a second end, that tapers to intersect the other end of the shroud.

2. The apparatus of claim 1 further comprising a fin extending from the shroud in planar alignment with the disc.

3. The apparatus of claim 2 wherein the fin and the disc are substantially the same thickness.

4. The apparatus of claim 2 wherein the shroud and the fin are unitarily formed.

5. The apparatus of claim 2 further comprising a frame supportable by the enclosure that, in turn, supports the shroud, the frame comprising a biasing member compressingly engageable with the enclosure providing an attachment force on the frame within the enclosure.

6. The apparatus of claim 5 wherein the frame further comprises a cavity that receivingly supports a filter.

7. A disc drive, comprising:
    an enclosure comprising a base and a cover;
    a disc stack rotated by a motor supported upon the base;
    an actuator supported by the base and having a distal end interfacing a data transfer element in a data transfer relationship with a data storage surface of the disc; and
    an airstream conditioning apparatus comprising a shroud supportable in the enclosure only downstream of the actuator with respect to air currents generated by the spinning disc and disposed along the data disc edge in a closely fitting relationship, wherein the shroud further comprises a perimeter surface that extends from a first end adjacent the terminal end of the shroud to a second end that tapers to other end of the shroud.

8. The disc drive of claim 7 wherein the airstream conditioning apparatus further comprises a fin extending from the shroud in planar alignment with the disc.

9. The disc drive of claim 8 wherein the fin and the disc are substantially the same thickness.

10. The disc drive of claim 8 wherein the shroud and the fin are unitarily formed.

11. The disc drive of claim 7 further comprising a frame supportable by the enclosure that, in turn, supports the shroud, the frame comprising a biasing member compressingly engageable with the enclosure providing an attachment force on the frame within the enclosure.

12. The disc drive of claim 11 wherein the frame further comprises a cavity that receivingly supports a filter.

13. A data storage device, comprising:
    a base supporting a spinning data storage disc operably interfacing an actuator in a data transfer relationship; and means for attenuating aerodynamic excitation by laminarizing the air flow created by the spinning disc at the disc and shroud interface.

14. The device of claim 13 wherein the means for attenuating aerodynamic excitation comprises a finned shroud attachable to the base terminating in a closely fitting relationship with the disc edge.

15. The device of claim 14 wherein the finned shroud comprises a fin disposed in planar alignment with the disc.

16. The device of claim 15 wherein the fin and the disc are substantially the same thickness.

17. The device of claim 15 wherein the shroud and the fin are unitarily formed.

18. The device of claim 14 wherein the means for preventing aerodynamic excitation further comprises a frame supportable by the base that, in turn, supports the finned shroud, the frame comprising a biasing member compressingly engageable with the base providing an attachment force.

19. The device of claim 18 wherein the frame further comprises a cavity that receivingly supports a filter.

20. The device of claim 14, wherein the shroud further comprises a perimeter surface that extends from a first end adjacent the terminal end of the shroud to a second end that tapers to intersect the interface of the actuator and the data disc.

21. The device of claim 13 comprising a disc drive assembly.

* * * * *